March 25, 1969 W. S. WATTS 3,434,746
FLEXIBLE TUBE COUPLING
Filed Aug. 10, 1966

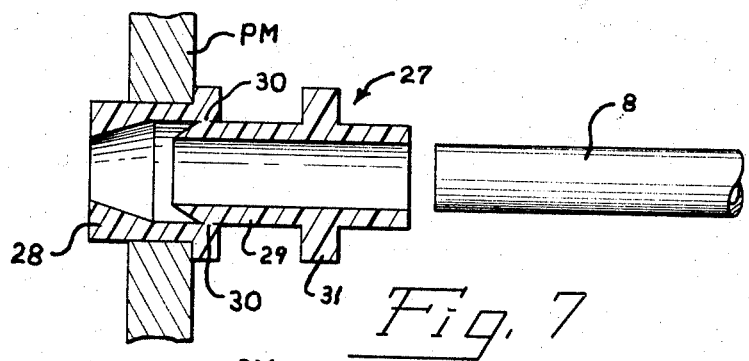
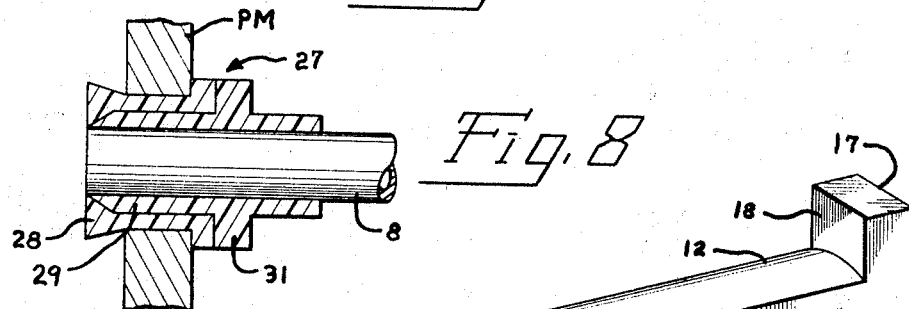
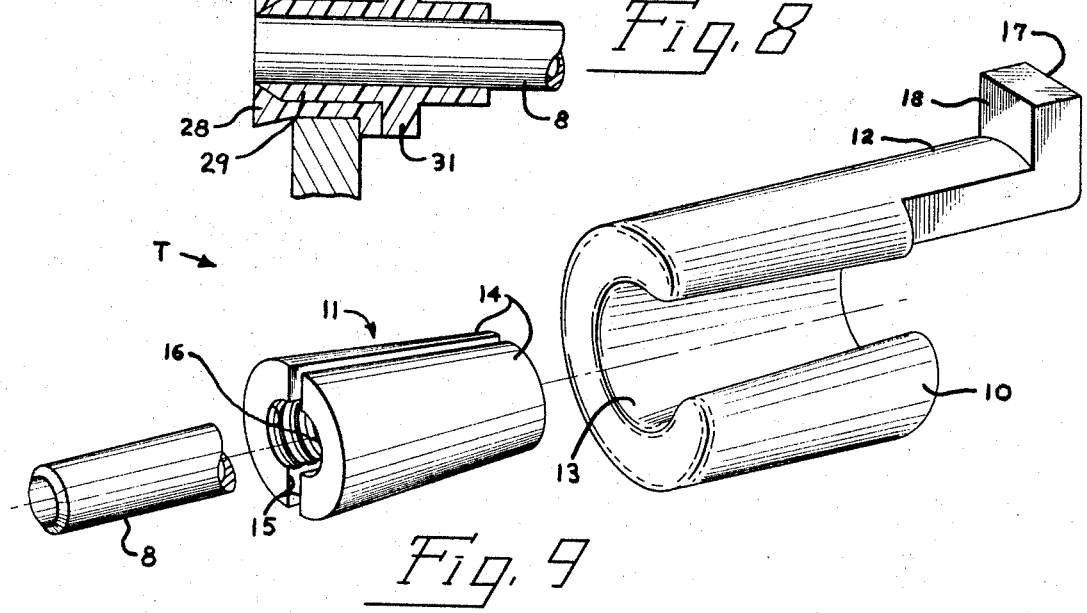
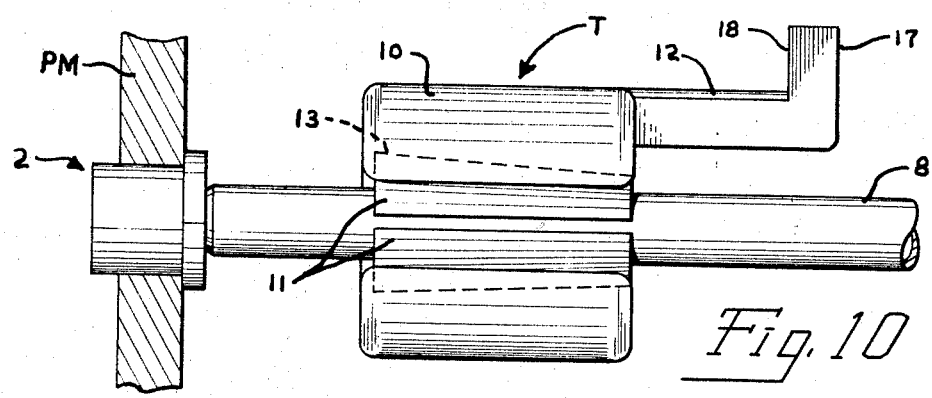

United States Patent Office 3,434,746
Patented Mar. 25, 1969

3,434,746
FLEXIBLE TUBE COUPLING
William Sewell Watts, Harrisburg, Pa., assignor to
AMP Incorporated, Harrisburg, Pa.
Filed Aug. 10, 1966, Ser. No. 571,546
Int. Cl. F16l 35/00, 37/00
U.S. Cl. 285—162                                1 Claim

ABSTRACT OF THE DISCLOSURE

A coupling member for sealingly connecting an end of a tubular member within an opening of a mounting member comprises a body member having the physical properties of organic plastic and including an exterior surface engageable with the hole and an interior surface provided with a first section of substantially constant diameter axially therealong and a second section of conical configuration with the smallest diameter thereof located at an inner end of the body member, the interior surface of the body member has the end of the tubular member forcefully driven therein with the first section of the interior surface frictionally and sealingly engaging the tubular member and the second section of the interior surface being wedgingly and sealingly disposed between the surface of the hole and the tubular member to secure the tubular member within the hole.

---

This invention relates to coupling members and more particularly to pipe, hose or tube coupling members or the like.

The conventional way to connect a line such as, a pipe, hose or tube within a mounting member is to drill a hole in the mounting member, thread the hole, screw a compression fitting into the threaded hole and then connect the line thereto. Each of these operations take a certain amount of time as well as skill on the part of the operator, especially the operation of screwing the fitting into the threaded hole and then applying an end of the line thereto which requires another tightening operation to threaded parts in order to provide a fitting that will not leak. The various factors such as, skill, tolerances of the parts, pressure of the line, etc., generally do not provide an acceptable connection during the initial operational steps to effect the connection.

Such a connection requires time to make and a number of parts, both of which are disadvantageous with regard to simple and economical standpoints.

An object of the invention is to provide a coupling member to connect a pipe, hose or tube in an unthreaded hole of a mounting member which is advantageous over the conventional approach.

Another object of the invention is the provision of a coupling member which is simple in construction and is easily installed to connect a pipe, hose or tube within an unthreaded hole of a mounting member.

A further object of the invention is to provide a novel coupling member to connect one end of a tubular member within an opening of a mounting member in a secure and sealed manner.

An additional object of the invention is the provision of a unique device having excellent adhering characteristics to strongly grip a hole in a mounting member and a tubular member to be connected therein and to provide an excellent fluid seal therebetween.

A still further object of the invention is to provide a simple one-piece coupling member to sealingly secure an end of a pipe or tube within a hole of a mounting member.

Still another object of the invention is the provision of a simple two-piece assembly to effectively and sealingly connect an end of a flexible hose in an unthreaded hole of a mounting member.

A still additional object of the invention is to provide a unitary coupling member having two parts in engagement with each other with one part disposable in a hole and the other part engageable on a tubular member and sealingly movable and securable within the one part.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration in order that others skilled in the art may fully understand the invention and the principles thereof and the manner of applying it in practical use so that they may modify it in various forms, each as may be best suited to the conditions of a particular use.

The foregoing and other objects are achieved by a preferred embodiment of a coupling member to sealingly connect an end of a tubular member within an unthreaded hole of a mounting member, the coupling member comprising a body member having the physical properties of organic plastic and including an exterior surface and an interior surface, the exterior surface conforming to a surface of the hole and engageable therewith, the interior surface having a first section and a second section, the first section having a substantially constant diameter and the second section defining a conical configuration with the smaller diameter of the conical configuration located at an inner end of the body member, a flange at an outer end of the body member for engagement with the mounting member, the end of the tubular member being forcefully pushed into the interior surface of the body member with the tubular member pushing the exterior surface of the body member into frictional and sealing engagement with the surface of the hole, the first section of the interior surface frictionally and sealingly engaging the tubular member and the second section of the interior surface being wedgingly and sealingly disposed between the surface of the hole and the tubular member to secure the tubular member within the hole. Another embodiment includes concentric sleeves spaced from each other by a bight, the space between the sleeves receiving a tubular member therein and this assembly is forcefully driven into a coupling member described above.

A further embodiment comprises the above-described coupling member provided with a tubular-engaging sleeve integrally connected together and the tubular-engaging sleeve is driveable into the coupling member thereby being shearable therefrom during the driving thereof into the coupling member.

In the drawings:

FIGURES 7 and 8 illustrate a further embodiment of the invention;

FIGURE 9 is an exploded perspective view of a tool to drive an end of a tubular member within a coupling member; and FIGURE 10 is a view of the tool of FIGURE 2 in its driving position.

Figure 1:
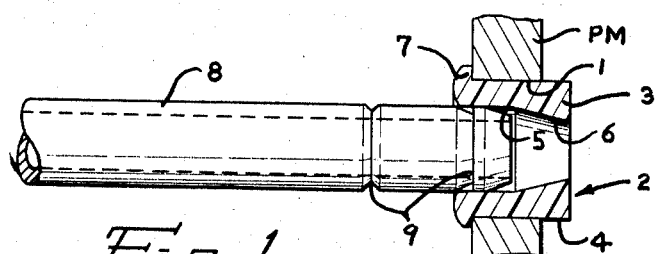
FIGURE 1 is a cross sectional view of a coupling member disposed in an opening of a mounting member with an end of a tubular member positioned to be driven into the coupling members.
Figure 2:
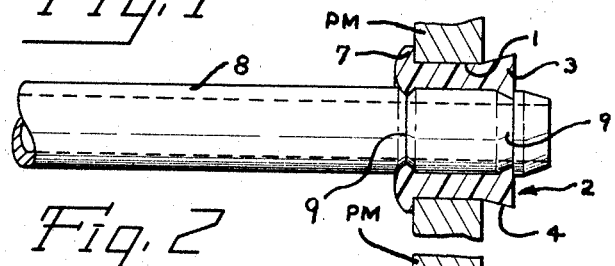
FIGURE 2 is a view similar to FIGURE 1 but with the tubular member in position within the coupling member.

Turning now to the drawings and particularly FIGURES 1 and 2, there is shown a panel member PM having an unthreaded opening 1 therein. A coupling member 2 is made from a suitable material having the physical properties of organic plastic or is made from any suitable organic plastic. Coupling member 2 comprises a body member 3 having an exterior surface 4 having a diameter so as to fit within opening 1 and the exterior surface generally conforms to the configuration of opening 1. Body member 3 also includes an interior surface having a first section 5 and a second section 6. As can be discerned, first section 5 has a constant diameter throughout whereas second section 6 has a conical configuration with the smallest diameter thereof located at the inner end of the body member. A flange 7 is located at the outer end of body member 3 for engagement with the outer surface of panel member PM to prevent the coupling member from being pushed through the opening.

Panel member PM is part of a fluid-containing device in which fluid is kept to be used to perform useful work. Coupling member 2 connects tubular member 8 to panel member PM and especially an end thereof. Grooves 9 may be formed in tubular member 8 depending upon the pressure of the fluid in the fluid-containing device. If the pressure is to be excessive, it is desirable to form both grooves in tubular member 8 and these grooves should be spaced apart a distance equal to the height of the coupling member. If the pressure is not excessive, only one groove may be necessary and this is preferably located adjacent the end of the tubular member for engagement with the inner end of the tubular member. If the pressure is small, then the grooves can be eliminated.

Tool T is used to drive tubular member 8 within coupling member 2 and it comprises a C-shaped body member 10, wedge-shaped inserts 11 and a handle 12. Body member 10 has an internal tapered surface 13 into which inserts 11 are inserted. Each insert 11 includes an arcuate external surface 14 which is tapered and flat inner surfaces 15 which are joined by an arcuate channel 16 having a serrated surface. External surfaces 14 of inserts 11 mate with tapered surface 13 of body member 10 and flat surfaces 15 of the inserts are engageable with each other when the inserts are inserted within tapered surface 13. Handle 12 extends outwardly from body member 10 and has an L-shaped configuration provided with driving surfaces 17 and 18.

In order to drive an end of tubular member 8 within coupling member 2, inserts 11 are placed on tubular member 8 with arcuate channels 16 in engagement therewith, body member 10 is placed around tubular member 8 through the opening in the C-shaped body member and tapered surface 13 is brought into engagement with the tapered and arcuate external surfaces 14 of inserts 11. A hammer is applied to driving surface 17 thereby driving the end of tubular member 8 within coupling member 2 so that first section 5 of the interior surface of the coupling member snugly engages the exterior surface of tubular member 8 and second section 6 wedgingly engages the exterior surface of tubular member 8.

The action of driving the end of tubular member 8 within coupling member 2, if it is organic plastic, longitudinally stretches the coupling member so that sections 5 and 6 of the interior surface of the coupling member securely and sealingly engage the exterior surface of the tubular member and exterior surface 4 of the coupling member is forcefully and sealingly pushed into engagement with the surface of opening 1 by tubular member 8. Also, the inner end of the coupling member is pushed outwardly beyond the diameter of opening 1 as a result of the configuration of second section 6 of the interior surface of the coupling member and the wedging action between this section and tubular member 8 positively secure the coupling member and tubular member in position within opening 1 in addition to forming a seal between the exterior surface of the coupling member and opening 1.

The coupling member may be disposed in a panel member having a thickness greater than the height of the coupling member since the forcing and wedging action exerted by the tubular member on the coupling member will still provide an excellent and mechanically sealed connection.

As can be discerned from FIGURE 2, if it is necessary to form both grooves 9 in the tubular member, the inner and outer ends of the interior surface of the coupling member will flow into these grooves to positively lock the tubular member within the coupling member. However, as stated hereinabove, a single groove or no groove may be disposed in tubular member 8 depending upon the pressure involved.

After tubular member 8 has been driven within coupling member 2 by means of tool T, the hammer is used to strike driving surface 18 so as to drive body member 10 free of inserts 11 so that the tool can be removed from the tubular member. It is to be understood, that the tubular member to be driven within coupling member 2 by means of tool T may be metallic or hard plastic. Of course, other types of tools may be used to drive the tubular member within the coupling member.

Figure 3:
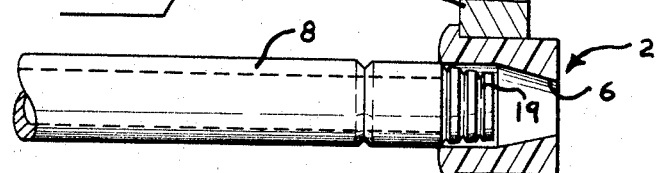
FIGURES 3 and 4 are views similar to FIGURES 1 and 2 of an embodiment thereof.
Figure 4:
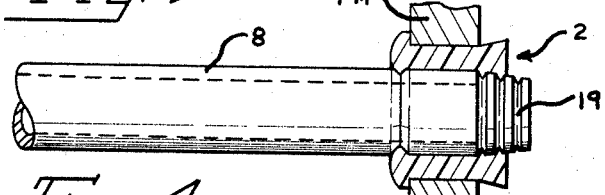

FIGURES 3 and 4 illustrate an embodiment similar to that of FIGURES 1 and 2 except the inner end of tubular member 8 has formed thereon a serrated area 19 which may be truncated threads. Second section 6 of the interior surface of coupling member 2 effectively grips the serrated area of tubular member 8 and increases the frictional engagement between coupling member 2 and tubular member 8.

Figure 5:
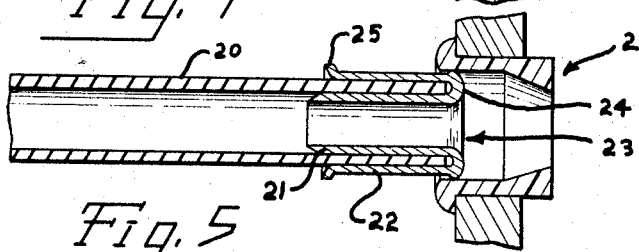
FIGURES 5 and 6 illustrate an additional embodiment of the invention.
Figure 6:
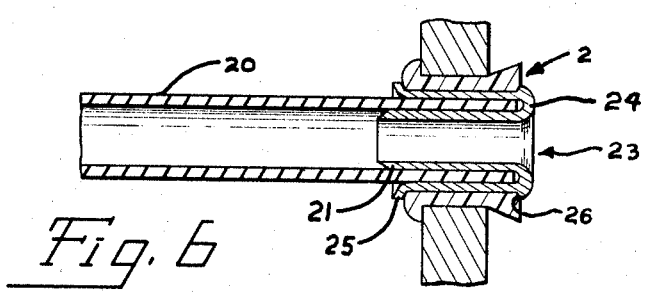

FIGURES 5 and 6 illustrate an additional embodiment of the invention to connect an end of a flexible tube 20 within coupling member 2. The end of flexible tube 20 is placed between sleeves 21 and 22 of tubular-mounting member 23 which can be made of metal or plastic. Sleeves 21 and 22 are connected together by a bight 24 and the outer end of sleeve 22 has a bell-mouth 25. A groove 26 may be disposed in sleeve 22 adjacent bight 24 so that the inner end of the inside surface of coupling member 2 can be disposed therein as illustrated in FIGURE 6. A similar groove may be disposed adjacent bell mouth 25. The use of grooves depends upon the pressure on the fluid as stated hereinbefore.

A tool similar to tool T is used to drive tubular mounting member 23 within coupling member 2 except that the leading edge of the tool is brought into engagement with bell mouth 25 to drive the tubular-mounting member within the coupling member. The engagement between the coupling member and tubular-mounting member 23 is the same as that of the embodiments of FIGURES 1 through 4.

The outer part of sleeve 22 may be segmented so as to be spring biased into engagement with flexible tube 20 by coupling member 2 in order to secure the end of the flexible tube within the tubular-mounting member. Flexible tube 20 may be secured to tubular-mounting member 23 in other ways such as, for example, expanding a section of sleeve 21 against the flexible tube, glue or in any other suitable manner.

FIGURES 7 and 8 illustrate a further embodiment of the invention which is directed to coupling member 27 having a coupling section 28 similar to that of coupling member 2 which is disposed within an opening of panel member PM. A tube-engaging section 29 is connected to coupling section 28 by a disconnectable section 30 between sections 28 and 29. Disconnectable section 30 comprises a thin piece of material integrally connecting sections 28 and 29 which is formed during the formation of coupling member 27. Section 30 maintains sections 28 and 29 as a unitary structure so that they will not become separated and is readily ruptured or disconnected when force is applied to annular projection 31 when a tool of the type to drive tubular mounting member 23 of FIGURES 5 and 6 is used to drive tube-engaging section 29 within coupling section 28 to connect tubular member 8 within the opening of the panel member. Grooves may be disposed at the inner end and adjacent projection 31 to operate in the same manner as grooves 9, FIGURES 1 and 2. Sections 28 and 29 may be connected by means of an annular groove and an annular projection in the interior surface of section 28 and the outer surface of the inner end of section 29 which are mateable to maintain these sections in engagement as a unitary structure. The groove and the projection also serve to be engaged by the ends of section 28 to positively secure section 29 therewithin.

As can be discerned from the foregoing, the coupling members of the present invention are simple in construction; inexpensive to manufacture; can be installed in a short period of time after a hole is drilled thereby requiring no labor for reaming, tapping, or wrench turning; resist corrosion when the coupling members are made of a suitable organic plastic for use with brass, copper, aluminum, steel or rigid plastic tubing; the coupling members do not damage the tubing; the coupling members can be disposed close to each other since no room is required to perform any wrench turning; provides a positive anchor to hold tubing in position to resist vibration and the coupling members provide an effectively sealed connection.

It will, therefore, be appreciated that the aforementioned and other desirable objects have been achieved; however, it should be emphasized that the particular embodiments of the invention, which are shown and described herein, are intended as merely illustrative and not as restrictive of the invention.

The invention is claimed in accordance with the following:

1. A coupling member to sealingly connect a flexible tubular member within an unthreaded hole of a mounting member comprising a body member having the physical properties of organic plastic and including an exterior surface and an interior surface, said exterior surface conformable to the surface of said hole and engageable therewith, said interior surface having a first section and a second section, said first section having a substantially constant diameter and said second section defining a conical configuration with the smaller diameter of said conical configuration located at an inner end of said body member, a flange at an outer end of the body member for engagement with said mounting member, a tubular-mounting member having an inner sleeve disposable in an end of said flexible tubular member, an outer sleeve surroundable about said end of the flexible tubular member and a section interconnecting said sleeve, an outer end of said outer sleeve having a bell-mouth and a groove being disposed at an inner end of said outer sleeve, said tubular-mounting member having said end of said flexible tubular member being forcefully pushed into said interior surface of said body member with the outer sleeve of said tubular-mounting member pushing the exterior surface of the body member into frictional and sealing engagement with the surface of said hole, the first section of the interior surface frictionally and sealingly engaging the outer sleeve of said tubular-mounting member with said bell mouth engaging said outer end of said body member and said second section of said body member being wedgingly and sealingly disposed between the surface of said hole and the outer sleeve of said tubular-mounting member, with said inner end of said body member being disposed in said groove to secure the flexible tubular member within the hole.

References Cited
UNITED STATES PATENTS

| | | | |
|---|---|---|---|
| 2,514,504 | 7/1950 | Moline. | |
| 2,664,458 | 12/1953 | Rapata | 16—2 X |
| 2,813,568 | 11/1957 | Kilmarx | 285—3 X |
| 3,030,130 | 4/1962 | Appleton | 285—158 X |
| 3,033,624 | 5/1962 | Biesecker. | |
| 3,076,668 | 2/1963 | Famely | 248—56 X |
| 3,272,542 | 9/1966 | Haulik et al. | 285—189 |

FOREIGN PATENTS

| | | |
|---|---|---|
| 230,217 | 5/1959 | Australia. |
| 1,252,076 | 12/1960 | France. |

CARL W. TOMLIN, *Primary Examiner.*

THOMAS F. CALLAGHAN, *Assistant Examiner.*

U.S. Cl. X.R.

16—2; 248—56; 285—3; 85—8.8, 82